United States Patent [19]

Seimiya et al.

[11] Patent Number: 4,511,622

[45] Date of Patent: Apr. 16, 1985

[54] INTERMEDIATE TRANSFER MEMBER FOR TRANSFERRING TONER IMAGE ON A CARRIER

[75] Inventors: Ryubun Seimiya; Noriyoshi Tarumi; Masakazu Kokiso; Hiroshi Tsuchiya, all of Hachioji, Japan

[73] Assignee: Konishiroku Photo Industry Co., Ltd., Tokyo, Japan

[21] Appl. No.: 423,050

[22] Filed: Sep. 24, 1982

Related U.S. Application Data

[63] Continuation of Ser. No. 279,325, Jul. 1, 1981, abandoned.

[30] Foreign Application Priority Data

Jul. 18, 1980 [JP] Japan ................................ 55-98994

[51] Int. Cl.[3] ........................... B32B 5/16; B32B 9/04

[52] U.S. Cl. .................................... 428/323; 428/211; 428/325; 428/331; 428/411.1; 428/447; 428/473.5

[58] Field of Search ............... 428/411, 419, 216, 323, 428/447, 331, 325, 211, 473.5

[56] References Cited

U.S. PATENT DOCUMENTS

| | | | |
|---|---|---|---|
| 3,993,825 | 11/1976 | Buchan et al. | 428/216 |
| 4,323,489 | 4/1982 | Beers | 428/447 X |

*Primary Examiner*—Thomas J. Herbert
*Attorney, Agent, or Firm*—Frishauf, Holtz, Goodman & Woodward

[57] ABSTRACT

An intermediate transfer member for transferring a toner image on a carrier which comprises an addition polymerization type silicone rubber. The intermediate transfer member has a marked characteristics of less exudating components such as unreacted components or residual components as compared with prior art products.

15 Claims, 3 Drawing Figures

INTERMEDIATE TRANSFER MEMBER FOR TRANSFERRING TONER IMAGE ON A CARRIER

This is a continuation of application Ser. No. 279,325 filed July 1, 1981, now abandoned.

The present invention relates to an intermediate transfer member for transferring a toner image on a carrier. More particularly, the present invention relates to an intermediate transfer member by which a toner image with a high resolution can be transferred and fixed at a high transfer efficiency with not only an insulated toner but an electro-conductive one.

In recording devices such as elecgrostatic recording, electrophotography and the like, an image has been heretofore formed, by a process wherein an electrostatic latent image is formed on a recording member and developed by the use of a developer comprising a toner and, if necessary, a carrier mixed therewith, the toner image thus developed is transferred onto an ordinary paper, for example, by any electrostatic means and then fixed.

However, in case that a toner is to be transferred electrostatically onto a transfer sheet by means of a transfer electrode such as a corona charger, a resolution of the formed toner image tends to be reduced together with more or less irregular electric charge. Moreover, in case that, for instance, an electro-conductive magnetic toner is applied which has been frequently employed in the art lately, a more irregular electric charge may occur and thus transfer is substantially infeasible. Also, in order to remove the defects in the above-mentioned electrostatic transfer process, a process has been attempted which comprises pressure-transferring onto a transfer sheet, for example, by means of a pressure roller, but there have been seen such disadvantages as only about half amount of a toner image being transferred owing to a poor transfer efficiency and so on. Accordingly, there has been proposed, for example, in Japanese Patent Publications No. 41679/1971 and No. 22763/1973; Japanese Patent laid-open Application No. 78559/1974; and U.S. Pat. No. 3,993,825 a process wherein said toner image is pressure-transferred onto an intermediate transfer member comprising a transfer layer of a rubber and then the so transferred toner image is pressure-transferred onto a transfer sheet under a molten state by using a heat roller. In such a process, a toner image is pressure-transferred onto the surface of a transfer layer of a rubbery material, which shows both a releasing property and a property capable of adhering finely divided particles upon pressure, such as silicone rubber, furuororubber and the toner image on said transfer layer is fused by heating in contact with any heat means such as a heat roller and simultaneously pressure-transferred and fixed onto a transfer sheet separately fed.

And yet, the above process proposed that the toner image fused by the aforesaid heating could be readily transferred and fixed onto a transfer sheet upon said releasing property of the transfer layer and hence no reduced resolution of a toner image was seen upon a transfer stage and also a high transfer efficiency could be attained.

However, all the above-mentioned rubbery transfer layers are composed of a material of a condensation polymer type and then frequently contain a comparatively large amount of any unreacted components so that there may be such a disadvantage of said unreacted components being adhered onto the surface of a recording member when said intermediate transfer member is pressed onto said recording member. More specifically, if even a minor amount of the unreacted component in said intermediate transfer member adheres onto the surface of a photosensitive layer, a serious result has been caused in that performance of the recording member with respect to the adhered portion thereof is deteriorated and thus an image-forming ability is reduced or lost.

This invention has been found in view of the foregoing state of the art and an object thereof is to provide an intermediate transfer member which can transfer a toner image formed on a recording member onto said intermediate transfer member at a high efficiency and further heat-transfer the toner image on said transfer member onto a transfer sheet. A further object of this invention is to provide an intermediate transfer member wherein an unreacted material is not adhered onto a recording member from the surface of said intermediate transfer member, when the toner image of the recording member is pressure-transferred onto the intermediate transfer member, and hence no deterioration of performance in said recording member is accompanied.

The aforesaid objects can be accomplished by an intermediate transfer member for transferring a toner image on a carrier which comprises an addition polymerization type silicone rubber.

According to the present invention having the above characteristic element, there can be also achieved such an effect that a toner image with a high resolution can be transferred and fixed at a high transfer efficiency with not only an insulated toner but a conductive one.

Figure 1:
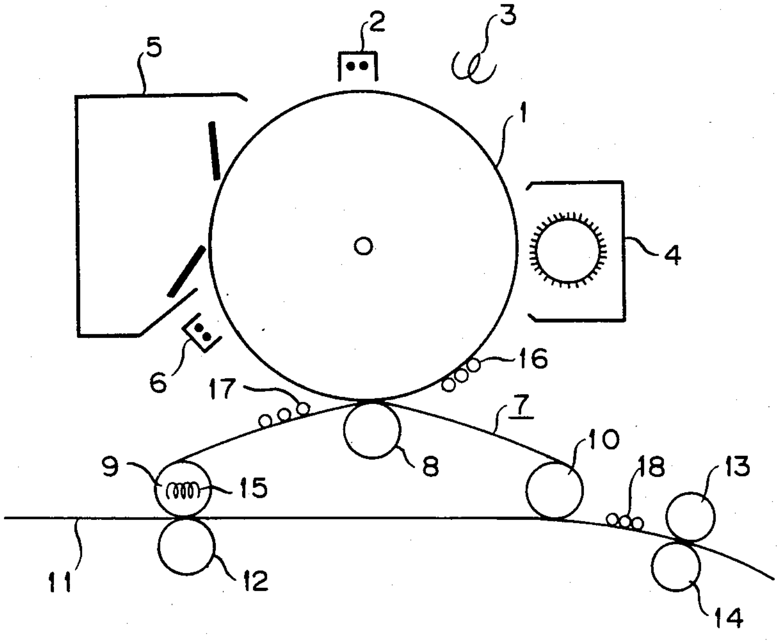
FIG. 1 shows a schematic drawing for the copying apparatus including an intermediate transfer member of the present invention.

The intermediate transfer member of this invention is composed of a substrate (72), an adhesive layer if necessary and a transfer layer (71) provided thereon. The above-mentioned substrate layer is selected from any of those materials having excellent physical properties such as scratch strength, tear strength, tensile strength at an elevated temperature, abrasion resistance, for example, electro-formed belts of aluminum, nickel, other metallic belts, resinous belts of a polyimide, a polyimide amide, a polyester, a polysulfone and a polyvinyl butyral, and preferably of a thickness ranging about 25–300$\mu$.

Next, as the adhesive agent may be employed adhesive agents such as an epoxy resin; silicone compounds such as a low molecular chlorosilane, silanol, siloxane. Such silicone compounds may be classified into a self-adhesive type and a non-self-adhesive type: The former is to be included in a substrate or preferably a transfer layer during the stage for pre-processing and molding them; for example, tackifiers, e.g., KE 41, KE 42, KE 66, KE 67, KE 68, KE 1212, KE 1800 (available fron Shin-Etsu Chemical Co., Ltd., Japan) are incorporated into the structure of the transfer layer to impart adhesion to said layer, while the latter, what is called "primers", is applied to form an adhesive layer between the substrate and the transfer layer.

As such non-self-adhesive type primers, there are known, for instance, Primers A, F, S and U (preferable in the case of a metal as a substrate), as well as Primers A, D, S, and T (preferable in the case of a synthetic resin as a substrate) and so on, which are available from Shin-Etsu Chemical Co., Ltd. Further, such tackifiers incorporated into the adhesive layer or transfer layer may be not required depending upon the material of said adhesive or transfer layer.

As the transfer layer which may be provided on the substrate, if necessary, through the adhesive layer, there may be employed any rubbery polymers having a releasing property as the main material for constructing said transfer layer and it is particularly desirable that an addition polymerization type silicone rubber is contained at not less than 60% by weight upon all components of said polymer.

More specifically, condensation polymerization type silicone rubber, fluororubber may be allowed to be employed in combination therewith to the extent that they do not adversely affect the effect of the present invention. However, a combined amount thereof even in that case should be less than 40% by weight upon all polymer components.

As the addition polymerization type silicone rubber which may be employed as the main component of the transfer layer in the present intermediate transfer member, there may be advantageously employed, for example, those linear or crosslinked polymers that are formed by reacting a silicone compound having a hydrogen-silicon bonding with a silicone compound having a vinyl group in the presence of, for example, a platinum catalyst according to the following reaction schemata:

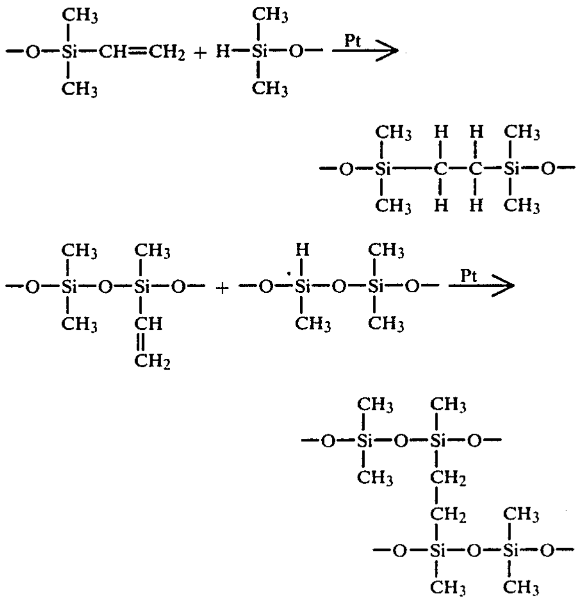

In the above reaction, platinum is employed as a catalyst, but this is one typical example. There may be also employed, for example, chloroplatinic acid, platinum black, platinum asbestos, platinum carbon, a peroxide, Lewis acid, cobalt carbonyl ($Co_2(CO)_8$), an alcohol complex of rhodium and, further, irradiation of radiant rays, radiation (e.g., γ-ray) may be applied. Moreover, where vulcanization is effected with the above various catalysts, vulcanization by heating at a lower temperature of around 100° C., what is called "Low Temperature Vulcanized" (LTV) type, is most preferable to the present invention, but vulcanization may be effected in a short period of time at a higher temperature of 150°-200° C. for improving workability.

The siloxane, which has a vinyl group and may be employed for the formation of an addition polymerization type silicone rubber as shown in the above reaction example, has the general formula [I]

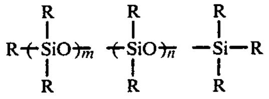
[I]

wherein R represents a hydrogen, a lower alkyl group such as an alkyl group having 1 to 4 carbon atoms, e.g., a methyl group and an ethyl group, a fluorinated lower alkyl group such as a trifluoromethyl group, an alkoxy group such as a methoxy group, an aryl group or an alkenyl group such as a vinyl group and an allyl group and at least one of R's is an alkenyl group; and m and n represent bond numbers of oxygen-silicon bonding units, respectively, and m+n is an integer of not less than 1, preferably of 1 to 10.

As illustrative examples of the compound included in the above general formula [I], there may be mentioned, for example, (1a) $[CH_2{=}CH(CH_3)_2Si]_2O$
(2a) $[CH_2{=}CH(CH_3)SiO]_3$
(3a) $[CH_2CH(CH_3)SiO]_4$
(4a) $[CH_2{=}CH(CH_3)SiO]_5$
(5a) $[CH_2{=}CH(CH_3)SiO]_6$
(6a) $[CH_2{=}CH(C_6H_5)SiO]_4$
(7a) $[CH_2{=}CHCH_2Si(CH_3)_2]_2O$
(8a) $[CH_2{=}CHCH_2Si(Ch_3)O]_3$
(9a) $[CH_2{=}CHCH_2Si(CH_3)O]_4$
(10a) $[CH_2{=}CHCH_2Si(CH_3CH_2)O]_4$
(11a) $[CH_2{=}CHCH_2Si(OCH_3)O]_4$ and
(12a) $[CH_2{=}CHCH_2Si(CF_3)_2]_2O$ The silicone compound, which has a hydrogen-silicon bonding as shown in the above reaction example, has the general formula [II]

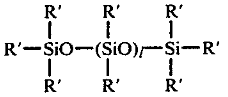
[II]

wherein R′ represents a hydrogen, a lower alkyl group such as an alkyl group having 1 to 4 carbon atoms, e.g., a methyl group and an ethyl group, an alkoxy group such as a methoxy group or an aryl group and at least one of R″s is a hydrogen; and l represents a bond number of oxygen-silicon bonding unit, and is an integer of 0 or more, preferably of 0 to 10.

As illustrative examples of the compound included in the above general formula [II], there may be mentioned, for example, (1b) $H(CH_3)_2SiOSi(CH_3)_3$
(2b) $[H(CH_3)_2Si]_2O$
(3b) $(CH_3)_3SiO[SiH(CH_3)O]Si(CH_3)_3$
(4b) $(CH_3)_3SiO[SiH(CH_3)O]_2Si(CH_3)_3$
(5b) $(CH_3)_3SiO[SiH(CH_3)O_3]Si(CH_3)_3$
(6b) $(CH_3)_3SiO[SiH(CH_3)O]_4Si(CH_3)_3$
(7b) $(CH_3)_3SiO[SiH(CH_3)O]_5Si(CH_3)_3$
(8b) $[H(CH_3)SiO]_3$ (9b) $[H(CH_3)SiO]_4$
(10b) $[H(CH_3)SiO]_5$
(11b) $[H(CH_3)SiO]_6$
(12b) $[H(CH_3)SiO]_7$
(13b) $[H(CH_3)SiO]_8$
(14b) $[H(CH_3.CH_2)SiO]_6$
(15b) $[H(CH_3O)SiO]_7$
(16b) $(CH_3)_3SiO[SiH(C_6H_5)O]_5Si(CH_3)_3$
(17b) $[H(CHF_2).SiO]_4$ and
(18b) copolymer of $SiO_2$, $(CH_3)_3SiO_{\frac{1}{2}}$ and $(CH_3)_2HSiO_{\frac{1}{2}}$ If such siloxanes, "KF-99" available from Shin-Etsu Chemical Co., Ltd., "SH-1107" available fron Toray Industries, Inc., Japan and so on are already known as commercially available.

Further, it is difficult to represent a polymerization degree and the like in a vulcanized rubber clearly, but, if expressed in terms of a rubber hardness, it is preferably in the range of 10-65 degrees and, more preferably, it should be in the range of 25-60 degrees.

In the transfer layer of the present invention may be incorporated a reinforcing filler for the purposes of increasing any physical strength thereof, and otherwise of acting as an extender and so on. A tensile strength of the silicone rubber is generally said to be about 3-10 $kg/cm^2$ and an increase in tensile strength can be mainly achieved by the addition of said reinforcing filler.

As such fillers for silicone rubber, there are known various fillers as shown in the following Table 1 together with properties thereof and said fillers are usually called "Filer" and commercially available, but it is said that the less a particle size thereof is and the larger a surface area thereof is, the more a reinforcing effect is.

The amount of the filler to be incorporated in the transfer layer is in the range of 0 to 50 parts by weight, preferably of 0 to 30 parts by weight per 100 parts by weight of the addition polymerization type silicone rubber.

TABLE 1

| | | Properties of filler for silicone rubber | | | | | |
|---|---|---|---|---|---|---|---|
| | | Property of filler | | | | Property of rubber | |
| Name of filler | Component | Average particle size (mμ) | Surface area ($m^2/g$) | pH | Specific gravity | Tensile strength ($kg/cm^2$) | Elongation (%) |
| Reinforced filler | | | | | | | |
| Valron (Estersil) | Surface treated silica | 8-10 | 275-300 | 7.6-9.5 | 1.98 | 70-140 | 400-800 |
| Aerosil | Highly pure aerosol silica | 15-20 | 130-380 | 4.5-6.0 | 2.0 | 40-85 | 200-600 |
| Cub-O-sil | Highly pure aerosol silica | 15-15 | 180-380 | 3.5-4.0 | 2.1 | 40-85 | 200-600 |
| Santocel C.S | Silica aerogel | 30 | 110-150 | 3.5-6.0 | 2.2 | 40-65 | 200-350 |
| Hi-sil X-303 | Precipitated silica | 20-25 | 140-160 | 4.5 | 1.95 | 40-65 | 200-350 |
| Metareinforced filler | | | | | | | |
| Celite 207 | Calcined clay silica | 1,000-6,000 | | 7.0 | 2.15 | 30-55 | 75-200 |
| Celite Super Flow | Calcined clay silica | 1,000-5,000 | 20 | 8.5 | 2.3 | 30-55 | 75-200 |
| Dicalite P.S | Calcined clay silica | 1,000-5,000 | <5 | | | 30-55 | 75-200 |
| Dicalite white | Calcined clay silica | 1,000-5,000 | <5 | | | 30-55 | 75-200 |
| Witcard R | Precipitated calcium carbonate | 30-50 | 32 | 11.3 | 2.65 | 30-40 | 100-300 |
| Neo Novacite | Ground silica | 1,000-10,000 | | | | 7-30 | 200-300 |
| Minusil | Quartz powder | 5,000-10,000 | | | 2.95 | 7-30 | 200-300 |
| Titanox R.A. | Titanium oxide | 300-400 | | 7.0 | 4.2 | 15-30 | 300-400 |
| XX-78 Oxide | Zinc oxide | 300 | 7.0 | | 5.65 | 15-35 | 100-300 |

Also, various additives may be incorporated into said transfer layer for the purposes of improving heat resistance and burning resistance, coloring, controlling resistance values and the like. Characteristics of the transfer layer can be improved by the addition of, for example, coloring agents such as pigments, e.g., carbon black, titanium white, white lead, and zinc white and other dyes; heat resistance improving agents such as iron compounds, e.g., iron caprylate and iron oxide, titanium oxide, nickel oxide, zirconium silicate and rare earth elements, e.g., celium and lanthanum; flame copper, nickel and cobalt, and organic halogeno compounds.

For the preparation of the present intermediate transfer layer, an addition polymerization type silicone rubber stock (usually in a paste state) containing reactive siloxane having a vinyl group, a reactive siloxane having a hydrogen-silicon bonding, a catalyst, a filler, a pigment and other additives is diluted with an organic solvent having a relatively higher boiling point of above 115° C., preferably above 130° C. to form a dope. Then, the dope thus formed is coated and dried over a substrate composed of said heat-resisting film or a metallic or plastic drum through or without an adhesive layer to a film thickness after drying of not less than 10μ, preferably 10-100μ and then cured by reaction with heating at a temperature, preferably about 100° C.-200° C.

The diluent for dope employed for the dilution of said silicone rubber stock are preferable for instance, toluene, xylenes, n-hexane and kerosine. By the use of such a diluent, there can be given such an advantage that flatness or smoothness of the transfer layer after coating and curing is improved; namely, a surface layer with a superior leveling is formed.

As measures for further improving the said leveling, there may be desirably added a fluorine-containing leveling-improving agent, for example, "FC-431", "FC-430" available from Sumitomo 3M Co., Ltd., Japan. Said improving agent should be selected so as to chemically combine with a silicone rubber without inhibiting vulcanization of said rubber and exudation while used.

Then, the present intermediate transfer member, as explained hereinabove, has a marked characteristics of less exudating components such as unreacted components or residual oils as compared with prior art products. Such exudating components tend to be brought out on pressure-transferring between a photoconductive member and an intermediate member and thus transferred and adhered onto the said photoconductive member to inhibit or lose characteristics of the photoconductive member, which lead to an extremely great influence.

The present inventors have tried to determine any exudating components from the present intermediate transfer member having a transfer layer of an addition polymerization type silicone rubber and from the transfer member having a transfer layer of a condensation polymerization type silicone rubber used in the prior art by means of the measurements as stated below. The results are summarized in the following Table 2.

MEASUREMENT

In a 200 ml flask with a stopper were placed strips of silicone rubber sample previously weighed and 100 ml of acetone were poured therein and agitation was done. After deaeration, it was allowed to stand at room temperature for 24 hours. Thereafter, it was dried by heating at 125° C. for 8 hours and, after cooling, weighed.

TABLE 2

| Test No. | Silicone rubber in transfer layer: Type | Trade name | Acetone extraction rate % | Contamination in photosenitive member |
|---|---|---|---|---|
| Present intermediate transfer member | | | | |
| 1 | Non-self-adhesive, addition polymerized | KE 1300 | 2.4 | None |
| 2 | Self-adhesive, addition polymerized | KE 1800 | 4.2 | None |
| Transfer member for comparison | | | | |
| 3 | Condensation polymerized (deacetic acid type) | KE 42 | 13.7 | Observed (Heavy) |
| 4 | Condensation polymerized (dealcohol type) | KE 47 | 12.3 | Observed (Heavy) |
| 5 | Condensation polymerized (oxime type) | KE 44 | 10.0 | Observed (Moderate) |
| 6 | Condensation polymerized | KE 20 | 12.7 | Observed (Heavy) |

In the Table 2, acetone extraction rate is expressed as follows:

$$\text{Acetone extraction rate} = \frac{\left(\begin{array}{c}\text{Silicone rubber}\\ \text{weight before}\\ \text{extraction}\end{array}\right) - \left(\begin{array}{c}\text{Silicone rubber}\\ \text{weight after}\\ \text{extraction}\end{array}\right)}{\left(\begin{array}{c}\text{Silicone rubber}\\ \text{weight before}\\ \text{extraction}\end{array}\right)} \times 100$$

All silicone rubbers above-tested are available from Shin-Etsu Chemical Co., Ltd.

It is also apparent from the test results that the silicone rubber employed in this invention shows less acetone extraction, namely not more than 8%, and the rubber of not more than 5% extraction is particularly advantageous, for instance, where copying is to be made many times.

The following examples are given for illustrating the present invention, but they are not construed to be limiting the embodiment of the invention.

EXAMPLE 1

In a beaker were placed 100 parts by weight of a self-adhesive, addition polymerization type silicone rubber (KE 1800 manufactured by Shin-Etsu Chemical Co., Ltd., vulcanizable, curable type at toom temperature), 100 parts by weight of toluene were added and mixed therein and deaeration was effected well to form a dope. The said KE 1800 had already contained a suitable amount of "Filer".

Figure 2:
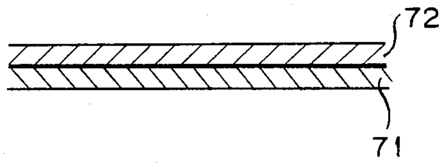
FIG. 2 and FIG. 3 show sectional drawings of the intermediate transfer members of the present invention.

The dope was coated over a polyimide film (manufactured by E. I. duPont, Capton) with a thickness of 50μ by means of a doctor blade to a dried film thickness of 50μ and dried and then heat-cured at 150° C. for 30 minutes to form an intermediate transfer member with a thickness of 100μ. The transfer layer of about 20 m/m was stripped from one end of the intermediate transfer member and then coated thinly with Primer KE 41 (manufactured by Shin-Etsu Chemical Co., Ltd.). The reverse side of another end was put upon the coated layer and allowed to stand under press over 24 hours to form an intermediate transfer member belt (7) as seen in FIG. 1. The intermediate transfer member belt (7) is composed of a substrate layer (71) of the polyimide and a transfer layer (72) of the silicone rubber as shown in FIG. 2.

Then, the said intermediate transfer member belt (7) was used, as shown in FIG. 1, as a belt which forms a toner image (16) over a photoconductive drum (1) through a charging means (2), an exposure means (3), a developing means (4), a charge ejecting electrode (6) and a blade cleaning apparatus (5), is conveyed by feed rollers (9) and (10) and transferred with the toner image (16) by a pressure roller (8), whereby an intermediate transferred image (17) was formed on the intermediate transfer belt (7), and then fused with heating by a built-in heat source (15) within the feed roller (9) and thereby the said intermediate transferred toner image (17) was heat-transferred onto a transfer paper sheet (11) by means of pressure roller 12 to form a final fixed toner image (18) and said transfer paper sheet (11) is removed therefrom via guide rollers 13 and 14, the process of which was repeatedly conducted to make copying.

As a result, a toner image of a high resolution without any fogging and reversal image was obtained even where 1000 times continuous copyings were done and no stain of a photoconductive member was developed at all.

EXAMPLE 2

Figure 3:
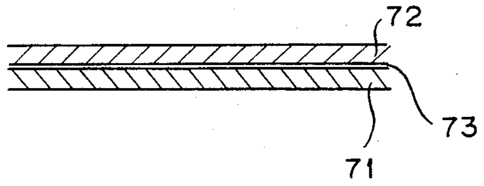

Following the same procedures as in Example 1 except that a non-self-adhesive, addition polymerization type silicone rubber (manufactured by Shin-Etsu Chemical Co., Ltd., room temperature vulcanized type) was employed as the transfer layer (72) and the substrate layer (71), which was composed of a polyimide previously treated with a primer (73) (manufactured by Shin-Etsu Chemical Co., Ltd., Primer T), was employed; there was formed the intermediate transfer member belt (7) as shown in FIG. 3. This belt was used according to the same process as in Example 1 to make a copied image, whereby a sharp image of a high resolution was given without any fogging.

EXAMPLE 3

A nickel electroformed endless belt with a thickness of 100μ was fitted in an intermediate transfer apparatus composed of feed rollers (9) and (10) and a pressure roller (8) as shown in FIG. 1, spray-coated thereon with the dope as prepared in Example 1 by means of a spray-gun, while heated by a transmitted built-in heat source (15) within the feed roller (9), and then dried and cured by heating at 150° C. for 30 minutes to form a transfer layer with a thickness of 70μ.

Where a toner image was made by the use of the so prepared intermediate transfer member belt according to the same process as in Example 1, a sharp image with a high resolution was repeatedly given.

EXAMPLE 4

Following the same manner as in Example 2 except that there was employed a non-self adhesive, addition polymerization type silicone rubber (manufactured by Shin-Etsu Chemical Co., Ltd., KE 1204, room temperature vulcanized type) which contained as a filler reddish brown iron oxide red, there was formed an intermediate transfer belt. Where a toner image was continuously made by the use of this belt according to the same process as in Example 1, a sharp image with a high resolution was similarly given.

COMPARATIVE EXAMPLE 1

Following the same manner as in Example 1 except that a non-self adhesive, condensation polymerization type silicone rubber (manufactured by Shin-Etsu Chemical Co., Ltd., KE 44, room temperature vulcanized type) was employed and heat-curing required about 4 hours at 150° C. (about 24 hours at room temperature), there was formed an intermediate transfer member belt. The belt thus formed showed a poor film strength and readily suffered from flaws if contacted with parts of the apparatus and the like, which resulted in a poor practicability.

Further, when a toner image was continuously made with the aforesaid intermediate transfer member belt according to the same process as in Example 1, a good image was initially given, but there were encountered such problems that fogging was increased and a negative image of the previously formed image appeared over a subsequent image as a temperature at the heat transfer part rose during repeated copying stage.

As is apparent from the above examples, the intermediate transfer member using an addition polymerization type silicone rubber according to this invention shows so many advantages in that a film strength in the transfer layer is higher and no stain of a photoconductive member is seen from unreacted components involved in the transfer layer and hence there are observed no increased fogging in a toner image, appearance of a reversal image and the like, as compared with the known intermediate transfer member of a condensation polymerization type silicone rubber and the like. Moreover, it can be seen that the present intermediate transfer member has additional advantage in that a curing reaction can be accomplished in a comparatively shorter period of time with respect to processing characteristics of the transfer layer.

We claim:

1. An intermediate transfer member for transferring a toner image on a carrier which comprises a substrate and a transfer layer, said transfer layer comprising an addition polymerization type silicone rubber having an acetone extraction rate of up to 8% containing up to 40% by weight of a condensation polymerization type silicon rubber based on the total weight of the polymer components, and a filler.

2. The intermediate transfer member of claim 1 wherein the acetone extraction rate of said silicone rubber is up to 5%.

3. The intermediate transfer member of claim 1 which further comprises an adhesive layer between said substrate and said transfer layer.

4. The intermediate transfer member of claim 1 wherein said filler is present in an amount of up to 50 parts by weight per 100 parts by weight of said addition polymerization type silicone rubber.

5. The intermediate transfer member of claim 1 wherein said transfer layer is substantially free of said condensation polymerization type silicon rubber.

6. The intermediate transfer member of claim 1 wherein the filler is selected from the group consisting of silica, calcined clay, calcium carbonate, quartz powder, titanium oxide and zinc oxide.

7. The intermediate transfer member of claim 1 wherein said intermediate transfer member is in the form of a belt and wherein said substrate is a substrate layer.

8. The intermediate transfer member of claim 7 which further comprises an adhesive layer between said substrate layer and said transfer layer.

9. The intermediate transfer member of claim 7 wherein the amount of said addition polymerization type silicone rubber in said transfer layer is at least 60% by weight based on the total weight of the polymer components.

10. The intermediate transfer member of claim 1, 7 or 9 wherein said addition polymerization type silicone rubber is a polymer formed by addition polymerization of a silicone compound having an alkenyl group and a silicone compound having a hydrogen-silicon bond.

11. The intermediate transfer member of claim 10 wherein said silicone compound having a hydrogen-silicone bond is a siloxane represented by the formula:

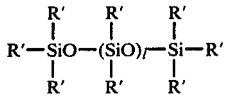

[II]

wherein each R′ represents hydrogen, a lower alkyl group, a fluorinated loweralkyl group, an alkoxy group and an aryl group and at least one of said R's is a hydrogen; and l represents a bond number of an oxygen-silicon bonding unit, and is an integer of at least 0.

12. The intermediate transfer member of claim 10 wherein said silicone compound having an alkenyl group is a siloxane represented by the formula:

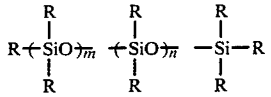

[I]

wherein each R is selected from the group consisting of hydrogen, a lower alkyl group, a fluorinated lower alkyl group, an alkoxy group, an aryl group and an alkenyl group and at least one of said R's is an alkenyl group; and m and n represent bonding numbers of oxygen-silicon bonding units, respectively, and m+n is an integer of at least 1.

13. The intermediate transfer member of claim 12 wherein said alkenyl group is a vinyl group or an allyl group.

14. The intermediate transfer member of claim 1, 7 or 9 wherein the rubber hardness of said silicone rubber is in the range of 10 to 65 degrees.

15. The intermediate transfer member of claim 14 wherein the rubber hardness of said silicone rubber is in the range of 25 to 60 degrees.

* * * * *